United States Patent
Cox

[19]

[11] Patent Number: 5,823,380
[45] Date of Patent: Oct. 20, 1998

[54] THERMAL COMBINATION CUP AND FLUID CONTAINER RECEPTACLE

[76] Inventor: Kingsley James Arthur Cox, 9 New York Ave., Stony Brook, N.Y. 11790

[21] Appl. No.: 881,637

[22] Filed: Jun. 24, 1997

Related U.S. Application Data

[63] Continuation of Ser. No. 499,276, Jul. 7, 1995, abandoned.

[30] Foreign Application Priority Data

Jul. 12, 1994 [GB] United Kingdom .................. 9414002

[51] Int. Cl.⁶ ....................................................... B67D 5/62
[52] U.S. Cl. ...................... 220/502; 220/703; 222/146.1; 222/450; 222/456
[58] Field of Search .............................. 222/146.1, 146.2, 222/146.5, 146.6, 131, 130, 154, 158, 450, 449, 454, 456, 465.1; 220/703, 713–715, 501, 502

[56] References Cited

U.S. PATENT DOCUMENTS

| | | | |
|---|---|---|---|
| 2,714,296 | 8/1955 | Scavullo | 222/130 |
| 2,873,050 | 2/1959 | Halverson | 222/450 |
| 2,887,254 | 5/1959 | Menderman | 222/454 |
| 3,650,439 | 3/1972 | Shimooka | 222/450 |
| 4,735,345 | 4/1988 | Lee | 222/146.5 |
| 4,921,112 | 5/1990 | Juhlin et al. | 222/456 |
| 5,085,330 | 2/1992 | Paulin | 220/501 |
| 5,292,039 | 3/1994 | Neofitou | 222/454 |

*Primary Examiner*—Philippe Derakshani
*Attorney, Agent, or Firm*—Galgano & Burke

[57] ABSTRACT

A thermal fluid receptacle, e.g., a vacuum flask, comprises a complete unit which is subdivided into a main fluid container A and a cup compartment B. Fluid from the main container may pass into the cup compartment by depressing a switch H and subsequently opening a stopper G between the main fluid container and the cup compartment. Another switch J located on the cup operates a stopper F on the top of the cup compartment allowing fluid in the cup to be accessed via an aperture E. Thus, the above receptacle enables fluid to be moved from one compartment, which may be heated, cooled, or enclosed by a vacuum, to another compartment all within the same receptacle.

20 Claims, 5 Drawing Sheets

THERMAL COMBINATION CUP AND FLUID CONTAINER RECEPTACLE

This is a continuation of application Ser. No. 08/499,276, filed Jul. 7, 1995, now abandoned.

This invention relates to fluid containers and drinking vessels.

BACKGROUND

Vessels used for holding and keeping fluids hot or cold for drinking purposes comprise a fluid containing compartment, which may or may not be insulated by a vacuum, and a cup compartment. When fluid is required, the cup compartment is detached from the fluid compartment and the fluid is then poured into the cup with the fluid container and the cup now being separate entities. An example of this is a vacuum flask.

For disabled people, or persons who only have the use of one free hand such as persons driving a vehicle or helming a boat, the above arrangement of pouring hot or cold fluid from one container into another is extremely cumbersome, if not impossible and possibly dangerous.

SUMMARY OF THE INVENTION

According to the present invention the fluid container and cup comprise one unit. Hot or cold fluid is held in an insulated compartment which is normally sealed from an adjoining cup compartment. Fluid is transferred from the insulated compartment to the cup compartment by inverting the whole unit and then depressing a switch which opens up a stopper, which when closed separates the container from the cup, and fluid is thereby able to flow by the force of gravity from the fluid container to the cup. To access the fluid which is now in the cup the whole unit is turned 180 degrees so that it is upright again and then another switch located on the cup is depressed which opens up a hole in the top of the cup. Fluid may be obtained from the cup by holding down the switch on the cup and tilting the whole unit at an angle.

The process of obtaining and drinking the fluid held in the insulated container can thus be accomplished by using only one hand. The whole unit can be held and operated by one hand and an integrally moulded hand grip facilitates this procedure.

BRIEF DESCRIPTION OF THE DRAWINGS

A specific embodiment of the invention will now be described with reference to the accompanying drawings in which.

DETAILED DESCRIPTION

Figure 1:
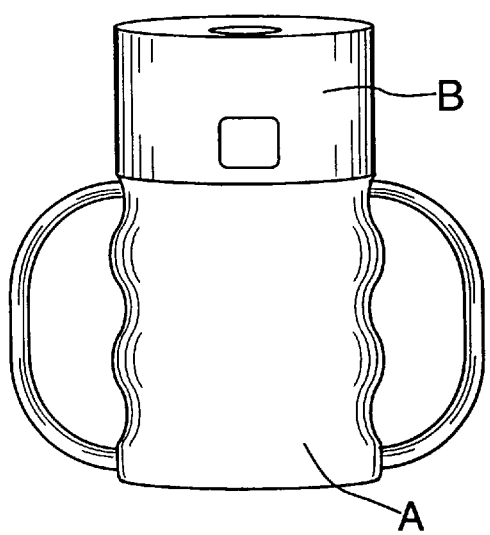
FIG. 1 shows a diagram of the entire unit viewed at an angle.
Figure 2:
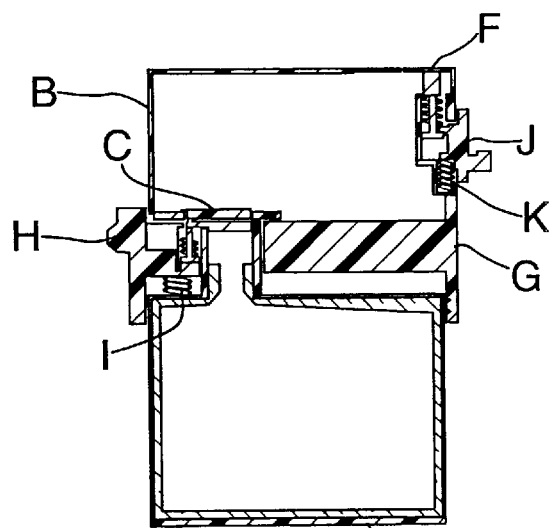
FIG. 2 shows a diagram of the entire unit viewed from the side.
Figure 3:
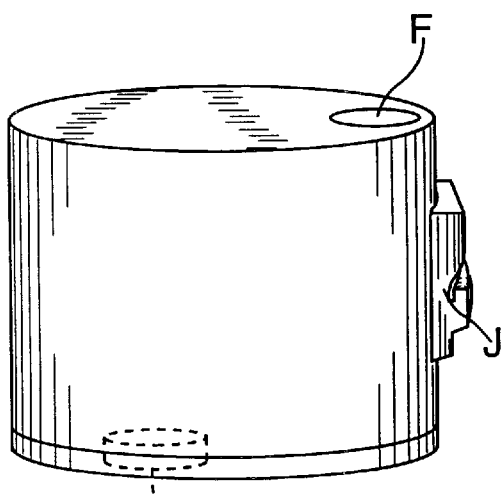
FIG. 3 shows a diagram of the cup compartment as it appears when unscrewed from the main container.
Figure 4:
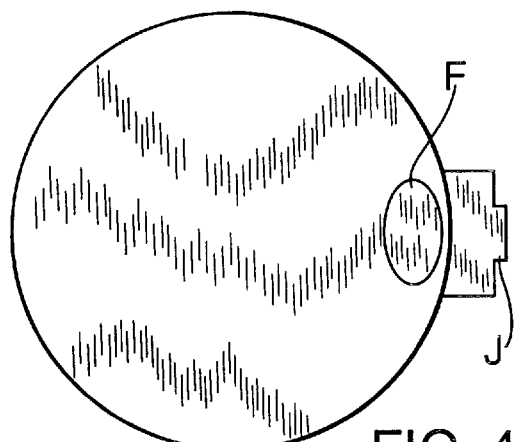
FIG. 4 shows the whole unit as viewed from the top.
Figure 7:
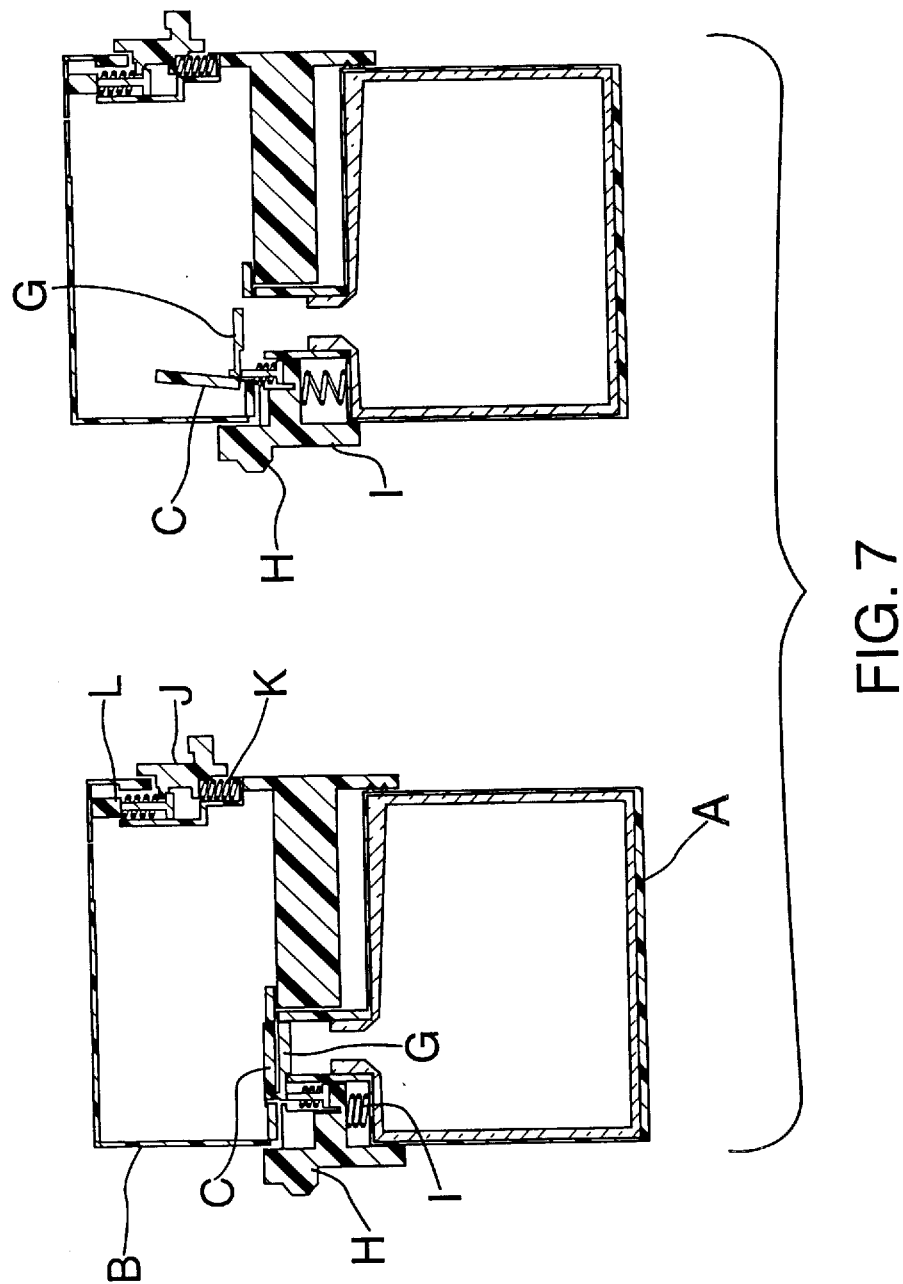
FIG. 7 shows how switch 1 opens the main stopper and cup flap.
Figure 9:
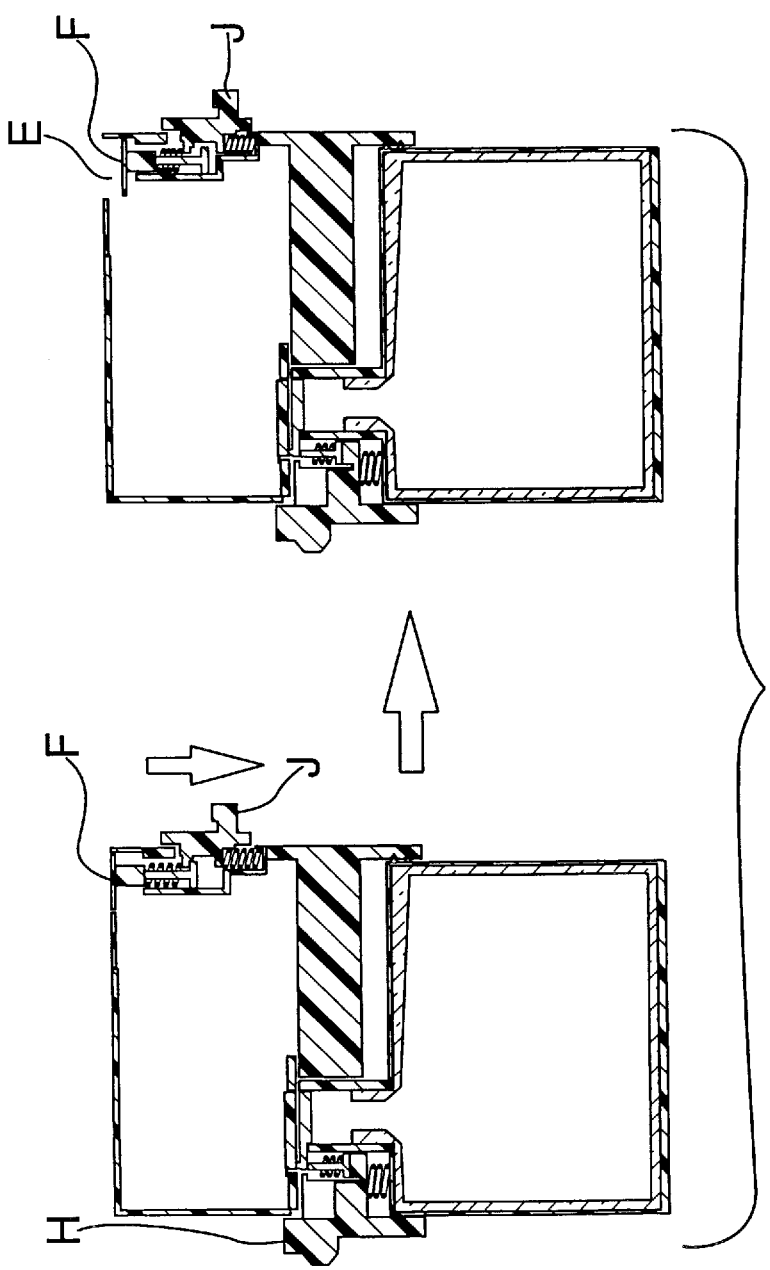
FIG. 9 illustrates how the cup stopper is opened subsequently uncovering an aperture in the cup.

The drawing in FIG. 1 gives a view of the whole unit. FIG. 2 shows a cross-section from top to bottom of the whole unit. There are two containers, an insulated fluid container A and a cup B, and the cup is screwed down onto the fluid container. The cup may be unscrewed from the fluid container so that the latter may be filled with liquids. The cup itself is a sealed vessel apart from two openings as shown in FIG. 3. There is an opening on the bottom of the cup which is covered by a flap C to prevent fluid from escaping when the cup is separated from the main fluid container. The flap is pushed upwards when switch 1 H is depressed, as shown in FIG. 7, allowing fluid to pass from the main fluid container to the cup. The second opening on the cup is on the top of the cup, which can be clearly seen in FIG. 9. It is the mouthpiece opening E and it is sealed by the mouthpiece stopper unless switch 2 J for the cup stopper F is depressed (FIG. 4). When this is done the mouthpiece aperture is now open (FIG. 9).

Figure 5:
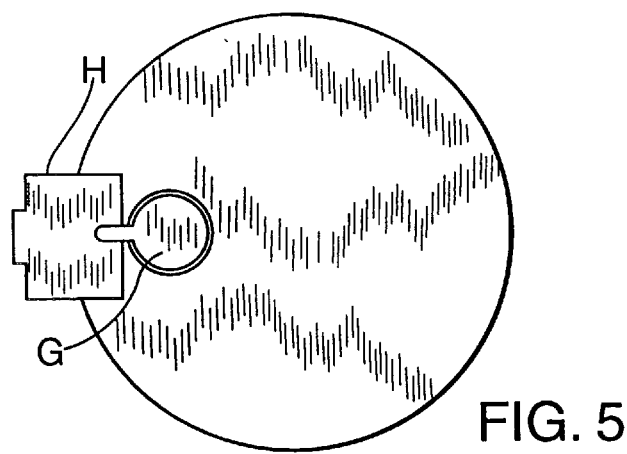
FIG. 5 shows the view from the top when the cup compartment has been unscrewed from the fluid container, i.e., an aerial view of the main fluid container.

FIG. 5 shows a horizontal cross-section at the level of the interface between the fluid container and the cup. Note the switch operated main stopper G. This is closed unless switch 1 H (FIGS. 2, 5, 6 and 7) is depressed (FIG. 7).

Figure 6:
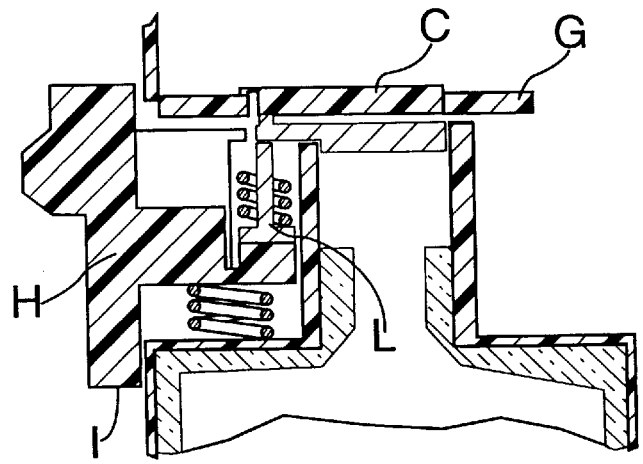
FIG. 6 shows a close-up of the switch which operates the main stopper.
Figure 10:
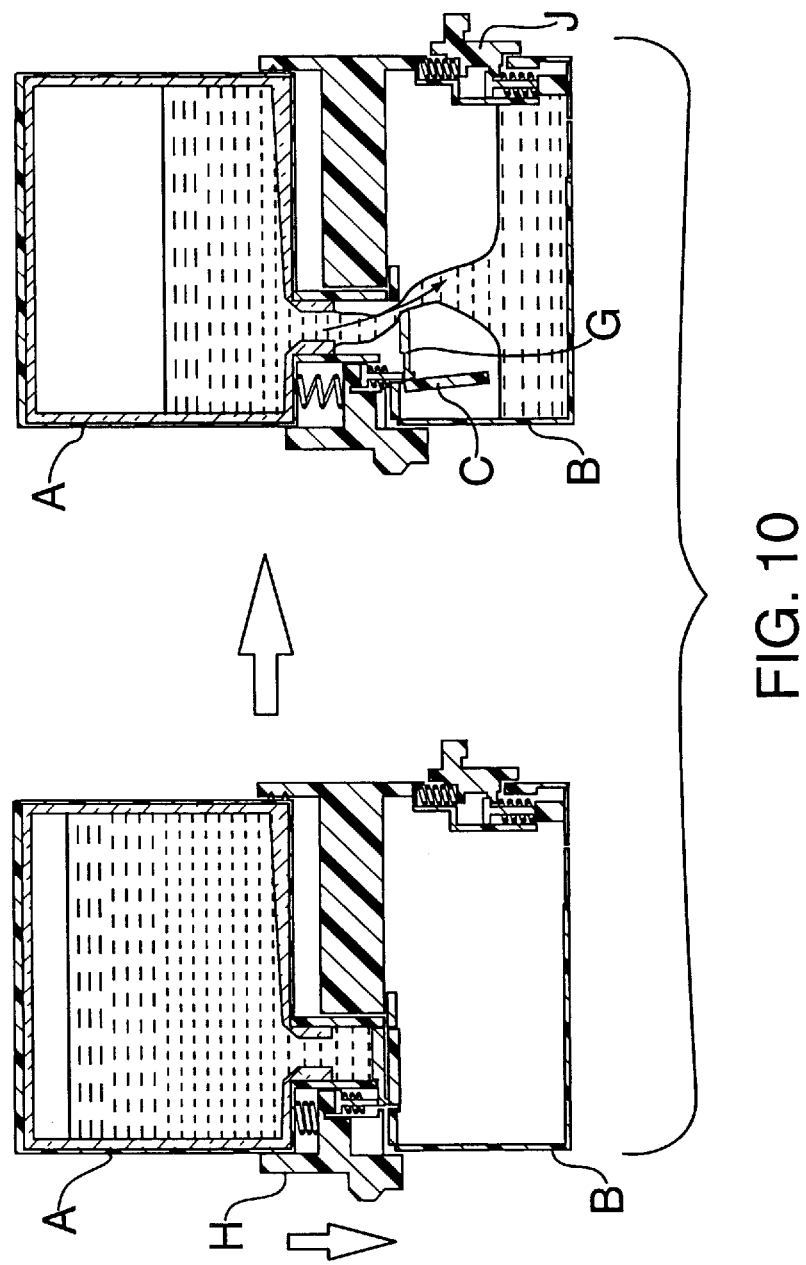
FIG. 10 illustrates how fluid is moved from the main fluid container to the cup compartment.

FIG. 6 shows the design of switch 1. When switch 1 is not depressed the main inter compartment stopper G is held shut by the balancing spring I. When switch 1 H is depressed the balancing spring I becomes extended and the main inter compartment stopper G and the cup compartment bottom flap C are pushed away from the main fluid container A thus allowing fluid to pass between the main fluid container A and the cup B, as shown in FIG. 7. When the pressure is released on switch 1 H the inter compartment stopper G is pulled back by the balancing spring I thus sealing the aperture again. In order for fluid to be able to move from the main fluid container to the cup the whole unit must be inverted 180 degrees and then switch 1 must be depressed. Fluid will then flow by the force of gravity from the main fluid container A and through the open inter compartment aperture and into the cup B, as shown in FIG. 10.

Figure 8:
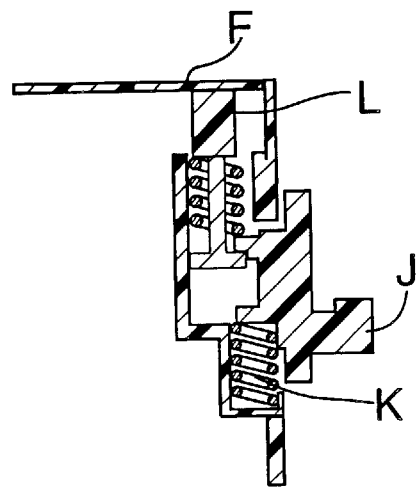
FIG. 8 shows a close-up of the switch which operates the cup mouthpiece stopper.
Figure 11:
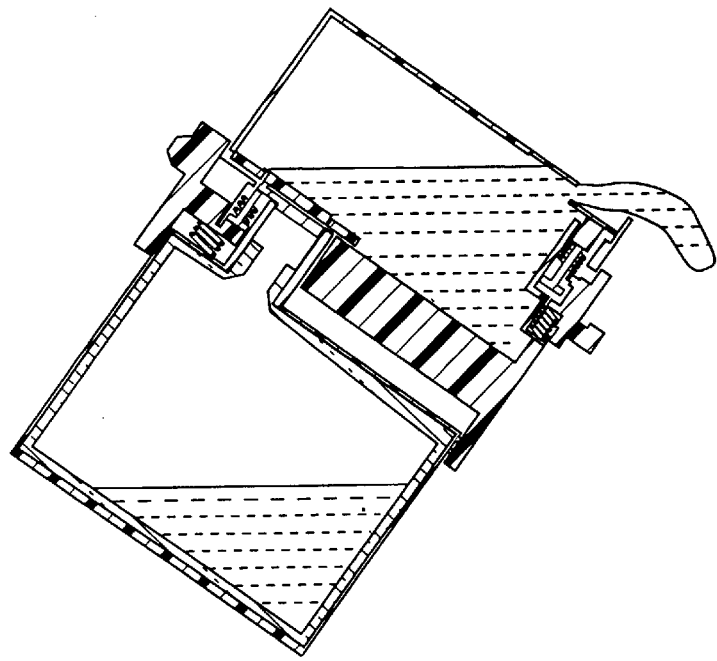
FIG. 11 illustrates how fluid leaves the cup compartment when the cup stopper is depressed.

When the cup is sufficiently full (indicated by a transparent measuring cylinder on the cup or by the fact the cup is made of a transparent material such as clear plastic) the whole unit may be turned 180 degrees again so that it is upright. FIGS. 9 and 11 illustrate how fluid is extracted from the cup. FIG. 9 shows the mechanism of action of the mouthpiece stopper which is operated by switch 2 J. The detail of the design of switch 2, which is similar to that of switch 1 H, can be seen in FIG. 8. When switch 2 J is depressed the cup mouthpiece stopper F is pulled down compressing the balancing spring K and opening the mouthpiece aperture E. At this point the open mouthpiece aperture is placed to the lips and the whole unit is tilted. Fluid flows out of E as shown in FIG. 11. When switch 2 J is released the balancing spring K pushes the cup stopper F up sealing the aperture E.

In both switches 1 and 2 fluid is excluded from the switch mechanism by the use of syringes L which are connected to the stoppers. Springs may or may not be present inside the syringes.

The whole operation of extracting and drinking fluid from the main fluid container may be accomplished with one hand. An important point here is that hot fluid cannot normally be drunk directly from an insulating device and it is necessary to cool the liquid via an intermediate vessel. The present invention allows this procedure within the same unit.

The main fluid container A may be insulated by a vacuum so as to keep fluids hot or cold before they enter the cup compartment B. Instead of, or in addition to, an insulating vacuum, the main fluid container A may be heated by a heating element or thermocouple or cooled by means such as the Peltier effect. In this case the main fluid container would be able to receive an electric current via a socket.

The combined receptacle of main fluid container and cup may be held by the use of handles and a moulded grip integral to the receptacle, so that one hand can perform the actions necessary to fill the cup compartment and subsequently access fluid from the cup compartment.

I claim:

1. A fluid receptacle comprising a fluid holding compartment and a cup compartment, connectable with one another by an inter compartment aperture, first closure means movable between a closed position closing the aperture to seal the compartments from one another and an open position allowing fluid to flow from the holding compartment to the cup compartment under gravity when the holding compartment is above the cup compartment, first opening means operable from the exterior of the receptacle for moving the first closure means to the open position, the cup compartment being substantially closed and defining a dispensing opening around which the lips of one's mouth may be placed and through which liquid in the cup compartment can be drunk, and second closure means integrally mounted to the cup compartment for closing and opening the dispensing aperture.

2. A receptacle according to claim 1 including first biasing means biasing the first closure means to the closed position.

3. A receptacle according to claim 2 including a second biasing means biasing the second closure means to the closed position.

4. A receptacle according to claim 1 including second opening means for moving the second closure means to the open position.

5. A receptacle according to any of claim 1 in which one or each of the opening means comprises a switch member which can be slid or depressed by one finger or thumb of a hand gripping the receptacle.

6. A receptacle according to claim 1 in which the holding compartment is insulated from the outside by a vacuum.

7. A receptacle according to claim 1 in which the holding compartment includes electrically powered means for heating or cooling fluid in the compartment.

8. A receptacle according to claim 1 in which the cup compartment may be detached from the holding compartment.

9. A receptacle according to claim 1 including an integrally moulded hand grip.

10. A receptacle according to claim 1 in which cup compartment or a part thereof is made of a transparent material in order to visualize the fluid level in the cup compartment.

11. A receptacle according to claim 3 in which one or each biasing means comprises two springs one in extension and the other in compression when the opening means is moved to open the associated aperture.

12. A receptacle according to claim 1 including a second biasing means biasing the second closure means to the closed position.

13. A receptacle according to claim 2 including second opening means for moving the second closure means to the open position.

14. A fluid receptacle comprising a fluid holding compartment and a cup compartment, connectable with one another by an inter compartment aperture, first closure means movable between a closed position closing the aperture to seal the compartments from one a another and an open position allowing fluid to flow from the holding compartment to the cup compartment under gravity when the holding compartment is above the cup compartment, first opening means operable from the exterior of the receptacle for moving the first closure means to the open position, the cup compartment being substantially closed and defining a dispensing opening around which the lips of one's mouth may be placed and through which liquid in the cup compartment can be drunk.

15. A receptacle according to claim 14 further comprising means for selectively opening and closing said dispensing aperture.

16. A receptacle according to claim 14 including first biasing means biasing the first closure means to the closed position.

17. A receptacle according to claim 14 including a second biasing means biasing the second closure means to the closed position.

18. A receptacle according to claim 14 including second opening means for moving the second closure means to the open position.

19. A receptacle according to claim 18 in which one or each of the opening means comprises a switch member which can be slid or depressed by one finger or thumb of a hand gripping the receptacle.

20. A fluid receptacle comprising a fluid holding compartment, means for insulating the holding compartment from the outside, and a cup compartment, connectable with one another by an inter compartment aperture, first closure means movable between a closed position closing the aperture to seal the compartments from one another and an open position allowing fluid to flow from the holding compartment to the cup compartment under gravity when the holding compartment is above the cup compartment, first opening means operable from the exterior of the receptacle for moving the first closure means to the open position, the cup compartment being substantially closed and defining a dispensing opening around which the lips of one's mouth may be placed and through which liquid in the cup compartment can be drunk.

\* \* \* \* \*